United States Patent
Räsänen (10) Patent No.: US 8,514,710 B2
(45) Date of Patent: Aug. 20, 2013

(54) DATA COMPRESSION NEGOTIATION IN A TELECOMMUNICATION SYSTEM

(75) Inventor: Juha Räsänen, Espoo (FI)

(73) Assignee: Nokia Corporation, Espoo (FI)

( * ) Notice: Subject to any disclaimer, the term of this patent is extended or adjusted under 35 U.S.C. 154(b) by 2381 days.

(21) Appl. No.: 11/105,401

(22) Filed: Apr. 14, 2005

(65) Prior Publication Data

US 2005/0286418 A1    Dec. 29, 2005

Related U.S. Application Data (63) Continuation of application No. 09/572,344, filed on May 17, 2000, now Pat. No. 6,898,181, which is a continuation of application No. PCT/IF98/00916, filed on Nov. 23, 1998.

(30) Foreign Application Priority Data

Nov. 24, 1997  (FI) .......................................... 974307

(51) Int. Cl.
    *H04L 12/26*     (2006.01)
(52) U.S. Cl.
    USPC ......................................................... 370/235
(58) Field of Classification Search
    None
    See application file for complete search history.

(56) References Cited

U.S. PATENT DOCUMENTS

| | | | |
|---|---|---|---|
| 5,384,780 A | | 1/1995 | Lomp |
| 5,533,019 A | * | 7/1996 | Jayapalan ..................... 370/352 |
| 5,570,389 A | * | 10/1996 | Rossi ............................. 375/220 |
| 5,809,066 A | * | 9/1998 | Suomi et al. ................... 375/222 |
| 6,118,834 A | * | 9/2000 | Rasanen ......................... 375/372 |
| 6,256,115 B1 | * | 7/2001 | Adler et al. .................... 358/442 |

FOREIGN PATENT DOCUMENTS

| | | |
|---|---|---|
| EP | 773693 | 11/1996 |
| EP | 836337 | 4/1998 |
| WO | 94/05104 | 3/1994 |
| WO | 96/27975 | 9/1996 |
| WO | 96/36154 | 11/1996 |
| WO | 99/27691 | 6/1999 |

* cited by examiner

*Primary Examiner* — Raj Jain
(74) *Attorney, Agent, or Firm* — Alston & Bird LLP (57) ABSTRACT

The invention relates to a method for setting up s data link, wherein an end-to-end link comprises at least two separate legs with error correction protocols. The legs may have different physical layer connections or their error correction protocols (V.120, RLP) may be different. An interworking function IWF according to the invention that is located between these legs is integrated such that the legs can communicate with each other during set-up of traffic channel in order to exchange data compression parameters. The IWF intervenes in an end-to-end data compression negotiation, performs protocol conversions on messages transmitted from one leg to another, synchronizes the legs, if required, by delaying the set-up of the faster leg and the compression negotiation, modifies the compression parameters provided by the legs, if required, and if the end-to-end data compression negotiation fails, it may set up data compression on only one leg.

30 Claims, 6 Drawing Sheets

Fig. 8 ns of frames).# DATA COMPRESSION NEGOTIATION IN A TELECOMMUNICATION SYSTEM

This application is a continuation of U.S. patent application Ser. No. 09/572,344, filed May 17, 2004 now U.S. Pat. No. 6,898,181, which is a continuation of international application PCT/FI98/00916, filed Nov. 23, 1998, both of which are incorporated by reference in their entirety herein.

FIELD OF THE INVENTION

The invention relates generally to data transmission in telecommunication systems and especially to implementation of data compression over a data link comprising at least two legs utilizing an error correction protocol.

BACKGROUND OF THE INVENTION

In modern digital mobile systems, traffic channels are capable of setting up a circuit switched data link by means of which a data terminal equipment that is connected to a data interface of a mobile station can transmit data to and from an interworking function unit (such as a data modem) placed on the mobile network side (e.g. at a mobile services switching centre) and further, by means of a fixed network data link, to and from another data terminal equipment. The maximum transmission rate for such data transmission is usually determined by the maximum capacity of the data channel set up over the radio path.

Data compression is widely used to increase the efficiency of data transmission. Possible redundancy is removed from a user data stream with a data compression algorithm at the transmitting end, which results in a reduced amount of data to be transmitted. At the receiving end, a decompression algorithm expands the user data back into its original form. Typical maximum compression ratios provided by the compression algorithms are in the range from 2:1 to 4:1, which enables the adaptation of a user data stream of up to 19200/38400 bps into a data channel of 9600 bps in a cellular radio system. However, the actual compression ratios provided by the compression algorithms are highly dependent on the type of the user data. There are several standard or de facto standard data compression methods. For example, data modems usually support ITU-T V.42 bis and MNP5 methods. In the digital GSM mobile system, for example, the recommendations determine that the ITU-T V.42 bis compression method is used between a mobile station MS and an interworking function IWF.

Data compression methods usually require completely error-free data transmission since even the smallest transmission error confuses the decompression algorithm at the receiving end. The ITU-T V.42 bis, for example, is based on dynamic build-up of compression trees according to specific rules at both the transmitting and the receiving end. If uncorrected transmission errors occur, the trees will develop differently and the data will be corrupted. Therefore, error correction that is as efficient as possible must be used over the entire data link in order to prevent the occurrence of transmission errors.

In modems, the error-correcting layer below the V.42 bis data compression is the ITU-T V.42 (LAPM, link access protocol for modems). In digital transmission through a PSTN (public switched telephone network) or an ISDN (integrated services digital network), the error-correcting layer below the V.42 bis data compression may be for example a V.120 protocol that operates in a multiframe mode (in other words the error correction is based on the retransmission of corrupted frames). The aforementioned error correction protocols are designed for error conditions that are typical of fixed lines, but they are insufficient or inappropriate for special conditions, such as a radio link. Therefore, it has been necessary to implement special error correction arrangements within a mobile system. For example in the GSM system, the error-correcting layer below the V.42 bis data compression is the radio link protocol RLP, which is also based on the retransmission of frames.

The use of data compression must be agreed on somehow and possible compression parameters must be negotiated before data transmission may begin. In the GSM system, both parties, i.e. a mobile station MS and a mobile services switching centre MSC, indicate their data compression support in call set-up signalling. Further, after the RLP has been set up, an inband negotiation takes place between the MS and the IWF by means of XID frames of the RLP. An inband negotiation takes place over a modem connection by means of XID frames of a V.42 protocol after the V.42 error correction protocol has been set up between the modems. An inband negotiation takes place over a V.120 connection by means of XID frames of a V.120 protocol after the V.120 error correction protocol has been set up.

In practice, there are data links that consist of physically and protocolwise separate legs, for example a GSM data call through a PSTN (the connection consists of two legs: 1) a GSM traffic channel with its protocols and 2) a modem connection through the PSTN) or a GSM data call through an ISDN (two legs: 1) a GSM traffic channel with its protocols and 2) an ISDN protocol, e.g. V.120). In such a case, there are two possibilities of providing data compression over the entire connection: 1) Separate compression on each leg (e.g. as defined currently in the GSM recommendations) and 2) end-to-end compression (as implemented by some mobile phone manufacturers in the GSM system).

Each embodiment has problems. In case 1), a high processing power is required in the IWF situated between the different legs for performing data compression in both directions on two different legs. Further, the IWF requires a large memory to support the compression trees of two different compression units. Between the compression units there must be a high speed interface so that uncompressed data can be transmitted from one compression unit to another.

End-to-end compression (case 2) can be implemented in such a way that the calling party requests for a transparent synchronous connection in order to handshake the error correction and data compression protocol from end to end (e.g. in a GSMIPSTN data call between the MS and the PSTN modem transparently through the IWF). This method has several drawbacks:

i) The error correction protocol has not necessarily been optimized for both legs. For example the error correction protocols V.42 and MNP4 supported by the modems are not optimal for a GSM traffic channel. The frame length is far longer than the frame length of the RLP. In deteriorating radio conditions, the probability of retransmission of such long frames is greater than that of the RLP frames, thus jamming the traffic channel effectively.

ii) If the end-to-end error correction and/or data compression negotiation fails, it is no longer possible to provide data compression for the legs. Assume for example that in a GSM/ISDN call, the transmission rate is 2*14.4 Kbps=28.8 Kbps on a GSM traffic channel (between the MS and the IWF) and 56 Kbps on an ISDN traffic channel (between the IWF and the ISDN terminal equipment). If end-to-end data compression can be negotiated, the uncompressed data rate might typically be 3*28.8 Kbps=about 90 Kbps. If the end-to-end compression negotiation fails and it is not possible to provide compression even on a leg, the data rate will be only 28.8 Kbps. If GSM compression could be negotiated between the IWF and the MS when the end-to-end compression negotiation fails, the end-to-end data rate would be the lower rate of the data rates of these two legs, e.g. 56 Kbps.

iii) The support of synchronous bearer services is required both in the mobile station and in the mobile network. For example in the GSM system, the availability of the synchronous bearer services is not as good as that of asynchronous bearer services. In practice, each GSM network and each mobile station that is capable of data transmission support the asynchronous bearer services.

WO 94/05104 discloses a digital mobile system, wherein end-to-end compression is used between a mobile station MS and a PSTN modem, but a different error correction protocol is used on a traffic channel of the mobile network and on a modem connection. The digital data link between the MS and the IWF modem over the radio path is a non-transparent asynchronous data link where it is possible to use automatically the error protection protocol (e.g. the RLP) of the radio system that has been optimized to correct errors over the radio link. The error correction required on the modem connection is obtained by providing the IWF modem with an error correction protocol that is similar to the one in the PSTN modem situated at the other end of the modem connection. The data compression functions are thus provided in the mobile system in the MS and the error correction of the modem connection is provided in the IWF modem that does not participate in any way in the data compression. However, at the beginning of the modem connection the IWF modem negotiates, by means of a handshaking carried out with the PSTN modem, the compression parameters to be used in the data transmission and forwards them to the MS.

WO 94/05104 solves some of the aforementioned problems, but it has other drawbacks. Firstly, the method disclosed in WO 94/05104 requires non-standard operations. For example in the GSM system, the MS must interrupt the set-up of the RLP in order to wait for the compression parameters from the IWF. In addition, there must be a specific addressing mechanism that provides access to special functionality required by the method in the IWF. Secondly, the MS cannot participate in the negotiation for the compression parameters, and therefore optimum conditions (the best common group of parameter values) cannot always be reached. Thirdly, this known method has no fallback possibility, i.e. if end-to-end data compression cannot be set up, it is no longer possible to provide data compression on a leg (e.g. between the MS and the IWF).

Similar problems also occur in interfaces between other telecommunication networks.

DISCLOSURE OF THE INVENTION

The object of the invention is to eliminate or alleviate the aforementioned problems.

These and other objects of the invention are obtained with a method and a system that are characterized by what is disclosed in the independent claims. The preferred embodiments of the invention are disclosed in the dependent claims.

In the present invention, an end-to-end connection consists of at least two separate legs with their own error correction protocols. The legs may have different physical layer connections or their error correction protocols may be different. The interworking function IWF according to the invention between these legs is integrated such that the legs are able to communicate with each other during the set-up phase of the traffic channel in order to exchange data compression parameters. The IWF intervenes in an end-to-end data compression negotiation, carries out protocol conversions on messages transmitted from one leg to another, synchronizes the legs with each other, if required, by delaying the set-up of the faster leg and the compression negotiation, modifies the compression parameters provided by the parties, if necessary, and if the end-to-end data compression negotiation fails, the IWF may set up data compression only on one leg.

A typical problem with legs utilizing different physical layer connections or different protocols is that the set-up of the error correction link protocol and/or the data compression negotiation (handshaking) are faster on one leg than on the other. In the present specification and claims, a fast leg and a slow leg refer to a leg that sets up the error correction protocol (performs handshaking) more rapidly and to a leg that sets up the error correction protocol (performs handshaking) more slowly, respectively. During the call set-up, different supervisions, such as time supervision or supervision of retransmissions, expire before the error correction protocol has even been set up on the slower leg. Due to different delays or timing differences, a similar process may also take place on legs that are approximately of equal speed (e.g. a call between two mobile stations in the same mobile network). According to the invention, the IWF delays the set-up of the error correction link protocol of the faster leg and/or the data compression negotiation while keeping the procedure in progress on the leg. This takes place for example by delaying transmission of responses to messages arriving from the faster leg as long as it is necessary or possible. However, if the error correction protocol must be set up during this delaying process and the error correction protocol of the slower leg has not yet been established and the data compression negotiation has not been started, the faster leg can be set in the disconnected mode where no data transmission is possible but where a data compression negotiation may typically begin. Transmission of a response to the data compression negotiation messages is then delayed until the slower leg has reached the same phase in the compression negotiation. It is usually very important that the faster leg is preferably slowed down already during the set-up of the error correction protocol since delaying only the data compression negotiation does not typically provide a sufficient amount of time for the slower leg to reach the same phase of the data compression negotiation with the faster leg due to the maximum number of retransmissions and the time supervisions.

In the following, a procedure according to the preferred embodiment of the invention will be described when a leg with the faster set-up initiates a data compression negotiation. At the beginning of the connection, the IWF aims at delaying the faster leg according to the invention as far as possible. The faster leg is called "link A" and the slower leg is called "link B". The IWF stores the parameters of the data compression negotiation that is activated by terminal equipment A situated at the far end of link A. If the other leg, link B, has not yet been set up, the IWF continues delaying link A by not responding to a data compression negotiation offer that is obtained from terminal equipment A. This typically makes terminal equipment A repeat the negotiation offer after a certain time supervision has expired.

If link B is set up while the IWF is still delaying the set-up of link A, the IWF sets up link A (both links are in the disconnected mode) and activates the timer in order to wait for possible data compression negotiation requests. If such a request is received from both legs, the IWF responds to both terminal equipment A and terminal equipment B with common parameter values that are derived from both negotiation offers. If no data compression requests are received, the IWF may try to negotiate the data compression on one of the legs (depending on the rules of the protocols used).

When link B has been set up (and guided to the disconnected mode by the IWF) and a data compression negotiation offer has been received from terminal equipment A, the compression parameters of terminal equipment A are transmitted via link B to terminal equipment B. The negotiation offer from terminal equipment A is still unanswered. During the negotiation, normal timer supervision and a retransmission mechanism are applied on link B. Simultaneously, the IWF ignores all retransmissions of the negotiation offer from terminal equipment A. After the IWF has received the negotiation response from terminal equipment B, it adapts the response to link A, i.e. it responds to the negotiation request of terminal equipment A with the data compression parameters received from terminal equipment B. The end-to-end negotiation for the data compression parameters has thus been completed.

If the IWF receives a data compression negotiation request from terminal equipment B before it has transmitted itself a negotiation request, the IWF responds to both terminal equipment A and terminal equipment B with the common parameter values that have been derived from both negotiation offers.

If no data compression can be set up on link B (due to e.g. a negative response from terminal equipment B or due to a decision by the IWF that results from expiry of a timer, for example), the IWF can still set up compression on link A, i.e. between terminal equipment A and the IWF, by responding to the negotiation request of terminal equipment A.

When the data compression negotiation has been completed, the IWF initiates a transition from the disconnected mode to the data transmission mode on both legs, i.e. link A and link B.

The second embodiment of the invention describes the procedure when the leg with the slower set-up initiates the compression negotiation. At the beginning, the IWF tries to delay the set-up of the faster leg, i.e. link A, and the compression negotiation as far as possible. After the set-up of link B and control of the disconnected modes, the IWF activates a timer and starts waiting for a possible data compression negotiation request. After the IWF has received a data compression negotiation request from terminal equipment B, it responds to an error correction protocol link set-up message from terminal equipment A and adapts the data compression request received from terminal equipment B to link A for transmission to terminal equipment A. If no request is received before the timer expires, the IWF may negotiate data compression anyway with terminal equipment B.

Normal time supervision and a retransmission mechanism are applied to the data compression negotiation on link A. The IWF simultaneously ignores all retransmissions of the negotiation offer from terminal equipment B. After the IWF has received a negotiation response from terminal equipment A, it adapts the response to link B, i.e. it responds to the negotiation request of terminal equipment B with the data compression parameters received from terminal equipment A. An end-to-end negotiation for data compression parameters has thus been carried out.

If the IWF receives a data compression negotiation request from terminal equipment A before it has transmitted itself a negotiation request, the IWF responds to both terminal equipment A and terminal equipment B with common parameter values derived from both negotiation offers.

If no data compression can be set up on link A (due to e.g. a negative response from terminal equipment A or a decision by the IWF resulting from expiry of a timer, for example), the IWF can still set up data compression on link B (i.e. between terminal equipment B and the IWF) by responding to the negotiation request by terminal equipment B.

When the data compression negotiation has been completed, the IWF initiates a transition from the disconnected mode to the data transmission mode on both legs, i.e. link A and link B.

BRIEF DESCRIPTION OF THE DRAWINGS

The invention will be described in greater detail in connection with the preferred embodiments and with reference to the accompanying drawings, in which.

PREFERRED EMBODIMENTS OF THE INVENTION

The invention can be applied on any data link consisting of separate traffic channel legs. The present invention is particularly suitable for digital mobile systems comprising data transmission services for transmission of data between a mobile station and the fixed network, such as ISDN and PSTN, or another mobile network. Different multiple access modulation methods are used in mobile systems to facilitate communication with a large number of mobile users. These methods include time division multiple access (TDMA), code division multiple access (CDMA) and frequency division multiple access (FDMA). The physical concept of the traffic channel varies in the different multiple access methods and it is primarily defined by means of a time slot in TDMA systems, a spreading code in CDMA systems, a radio channel in FDMA systems, by means of a combination thereof, etc. The basic idea of the present invention, however, is independent of the type of traffic channel and the multiple access method used. The present invention is also applicable in wireless local loop (WLL) networks or satellite-based mobile networks.

The present invention is particularly suitable for data transmission applications in the pan-European digital mobile system GSM (global system for mobile communications) and in other GSM-based systems, such as the DCS1800 (digital communication system) and the American digital cellular system PCS (personal communication system), and in WLL systems or satellite systems based on the aforementioned systems. The invention will be described below by using the GSM mobile system as an example. The structure and operation of the GSM system are well known to those skilled in the art and they are defined in the GSM specifications of the ETSI (European Telecommunications Standards Institute). Reference is also made to The GSM *System for Mobile Communications*, M. Mouly & M. Pautet, Palaiseau, France, 1992, ISBN:2-95071900-7.

Figure 1:
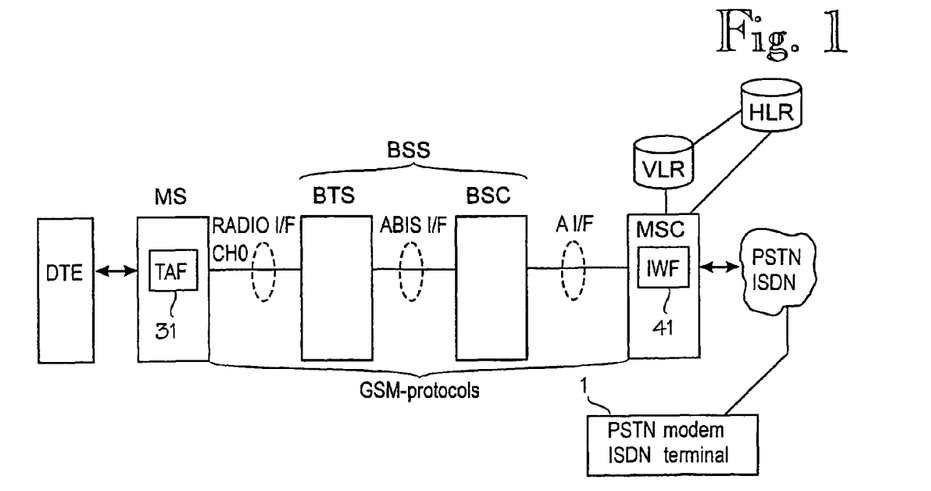
FIG. 1 shows a GSM mobile system.

The basic structure of the GSM system is shown in FIG. 1. The GSM structure consists of two parts: a base station system BSS and a network subsystem NSS. The BSS and the mobile stations MS communicate via radio connections. In the BSS, each cell is served by a base station BTS. A number of BTSs are connected to a base station controller BSC the function of which is to control radio frequencies and channels used by a BTS. The BSCs are connected to a mobile services switching centre MSC. Certain MSCs are connected to other telecommunication networks, such as the PSTN, and they comprise gateway functions for calls terminating at and originating from these networks. These MSCs are known as gateway-MSCs (GMSC). There are also at least two databases: a home location register HRL and a visitor location register VLR.

A mobile system comprises adapter functions for adapting an intranetwork data link to the protocols used by terminal equipments and other telecommunication networks. The adapter functions typically include a terminal adaptation function TAF placed in the interface between a mobile station and a data terminal equipment connected thereto, and an interworking function IWF situated at the interface between the mobile network and another telecommunication network, usually in connection with an MSC. An MSC typically comprises several different types of adapter equipment pools for supporting different data services and protocols, such as a modem pool with modems and facsimile adapters for modem and facsimile services, a UDI/RDI rate adapter pool, etc. With reference to FIG. 1, in the GSM system a data link is set up between a TAF 31 of the MS and an IWF 41 in the mobile network. In data transmission occurring in the GSM network, this data connection is a V.110 rate-adapted, UDI-coded digital full duplex connection that is adapted to V.24 interfaces. A radio link protocol RLP is also used in non-transparent data services on a GSM connection. The TAF adapts a data terminal equipment DTE connected to the MS to the aforementioned GSM data link that is set up over a physical connection using one or several traffic channels. The IWF connects the GSM data link to a V.110 or V.120 network, such as an ISDN or another GSM network, or to some other transit network, such as a PSTN. The CCITT recommendation for a V.120 rate-adapted connection is disclosed in the CCITT White Book: V.120.

As described above, modern mobile systems support different teleservices and bearer services. The bearer services of the GSM system are defined in the GSM specification 02.02 version 5.3.0, and the teleservices are defined in the GSM specification 02.03 version 5.3.0.

Figure 2:
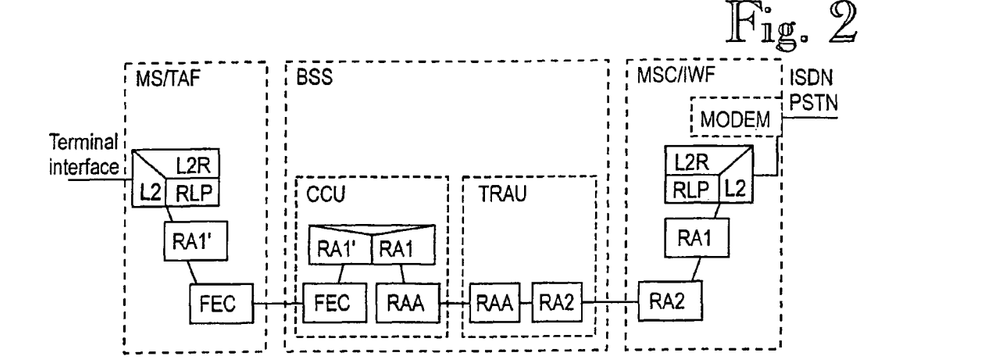
FIG. 2 shows protocols and functions required in a GSM system in non-transparent asynchronous bearer services.

FIG. 2 shows examples of protocols and functions required in the IWF for non-transparent bearer services. A non-transparent circuit switched connection between a TAF and an IWF on a GSM traffic channel comprises several protocol layers that are common to all these services. They include different rate adaptation RA functions, such as RA1' between the TAF and a channel codec unit CCU placed in the BSS, RA1 between the CCU and the IWF, RAA between the CCU and a transcoder unit TRAU placed remote from the base station, and RA2 between the TRAU and the IWF. The rate adaptation functions RA are defined in the GSM recommendations 04.21 and 08.20. Communication between the CCU and the TRAU is defined in the GSM recommendation 08.60. Information that has been RA1' rate-adapted in the radio interface is also channel-coded as defined in the GSM recommendation 5.03, which is illustrated by blocks FEC in the MS and the CCU. The IWF and the TAF also comprise higher-level protocols that are specific to each service. In an asynchronous non-transparent bearer service the IWF requires an L2R (layer 2 relay) protocol and a radio link protocol RLP and a modem or a rate adapter towards the fixed network. The L2R functionality for non-transparent character oriented protocols is defined for example in the GSM recommendation 07.02. The RLP is defined in the GSM recommendation 04.22. The RLP is a frame-structured, balanced (HDLC-type) data transmission protocol, where error correction is based on retransmission of distorted frames at the request of the receiving party. The interface between the IWF and for example an audio modem MODEM is as defined in CCITT V.24 and it is denoted by L2.

The GSM system (Phase 2+) is provided with data compression according to ITU-T V.42 bis extending from the MS to the IWF. The error correction function is provided with the RLP and not with the ITU-T V.42 protocol. In the protocol structure shown in FIG. 2, the data compression V.42 bis is located in the L2R functionality that can therefore also be called L2R bis. The compression function and the related parameters are negotiated between the MS and the IWF during the set-up of the RLP link by using RLP XID (Exchange Identification Procedure) frames. The IWF also executes the compression function and the negotiation of the parameters during the link set-up with a PSTN modem or an ISDN terminal equipment.

Figure 3:
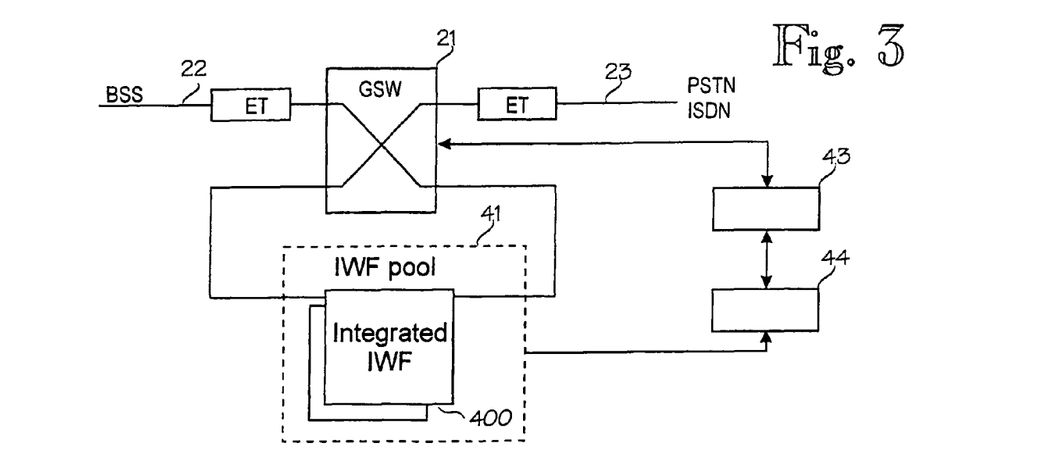
FIG. 3 illustrates an interworking unit according to the invention placed in connection with a mobile services switching centre.

FIG. 3 shows an adapter equipment or pool 41 that is placed in connection with an MSC. The pool 41 comprises one or several channel controllers 400. Each channel controller 400 may comprise one adapter function or all the integrated adapter functions that the channel controller should support. For example, a channel controller may support fixed network UDI/RDI protocols (ITU-T V.110 and/or ITU-T V.120), 3.1 kHz modem functions, facsimile group 3 functions, and PCM codec (PCM coding/decoding) functions. The channel controller 400 may be specific to a traffic channel, as in FIG. 3, or alternatively common to a number of traffic channels, e.g. to all the traffic channels of a PCM link of 2 Mbps. Each channel controller 400 of the IWF pool 41 is connected in parallel to a group switch GSW21 of the MSC. Digital transmission links 22 applied to the BSSs via exchange terminations are also connected to the group switch 21. Further, transmission channels 23 of other telecommunication networks, such as ISDN or PSTN, are also connected to the group switch 21 via the exchange terminations ET. The group switch GSW21 and the IWF as well as the set-up, maintenance and release of data calls are controlled by call control 43. The operation of the IWF is controlled by an IWF controller 44, which selects and switches, guided by the call control 43, a free channel controller 400 to the data link for a data call. The IWF controller may also comprise a pool controller, and there is one pool controller for each IWF pool. As an example of an MSC where the interworking function disclosed above can be utilized is the DX200 MSC of Nokia Telecommunications.

A channel controller according to the preferred embodiment of the invention performs a flexible handshaking of the compression parameters in the case of two different legs, i.e. a GSM traffic channel and a fixed network traffic channel. It also enables set-up of a non-transparent asynchronous data link without data compression, with end-to-end data compression or with data compression on at least one leg (e.g. the GSM traffic channel).

Figure 4:
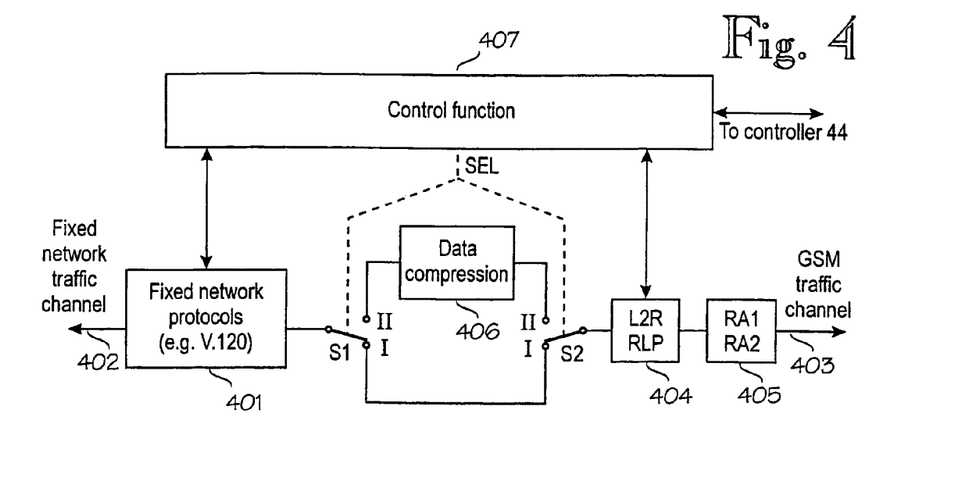
FIG. 4 is a block diagram of a channel controller according to the invention supporting UDI data links.

FIG. 4 is a general block diagram illustrating as an example a channel controller 400 implementing the invention for digital (UDI/RDI) data calls. Functions required by the fixed network protocols (e.g. V.120) that are used towards a traffic channel 402 of the fixed network are situated in a unit 401. RA1 and RA2 rate adaptation functions and L2RIRLP functions towards the GSM traffic channel are carried out in units 405 and 404. The units 401 and 404 can be connected together with switch functions S1 and S2 either directly or via a data compression unit 406. When S1 and S2 are in position II, the units 404 and 401 are connected together via the data compression unit 406. In the preferred embodiment of the invention, the data compression unit 406 performs V.42 bis data compression on data that is transmitted from the fixed network traffic channel 402 to the GSM traffic channel 403 and V.42 bis data decompression in the opposite direction. The data compression unit 406 is typically connected on the channel when the end-to-end compression negotiation has failed but data compression is still possible on the GSM traffic channel. In such a case, it is possible to reach higher data rates on the end-to-end connection as well, since the GSM traffic channel is usually slower than for example a digital ISDN connection. The switch functions S1 and S2 and the units 401 and 404 are controlled by a control function 407. The control function 407 co-ordinates a link set-up handshaking and a data compression negotiation according to the fixed network protocol (such as V.120) that are carried out by the unit 401 towards the fixed network. Correspondingly, the control function 407 co-ordinates RLP link set-up and a data compression negotiation that are carried out by the unit 404 with the MS on the GSM traffic channel 403. The control function 407 also synchronizes the data compression negotiations of the units 401 and 404 by delaying the link set-up and the handshaking of the faster leg and it transmits compression parameters between the units. If required, the control function 407 also modifies the compression parameters. The control function 407 is controlled by the IWF controller 44 (FIG. 3).

It must be noted that in a practical implementation the channel controller 400 can be realized with one signal processor, such as C541DSP of Texas Instruments. Therefore, the detailed implementation of the channel controller 400 or the IWF pool 41 according to the invention may vary almost without limits from one application to another.

The operation of the IWF of FIG. 4 and the related set-up of a mobile-originating (MO) and a mobile-terminating (MT) data call will be described below.

In a mobile-originating (MO) call, the MS transmits to the MSC a call set-up message SETUP, which contains a bearer capability information element BCIE indicating the type of the requested call and the bearer services and protocol required in the call. Bit 7 in octet 4 of the BCIE determines, in the direction from the MS to the network, whether data compression is allowed (b7=1) or not (b7=0). In the opposite direction from the network to the MS, bit 7 in octet 4 of the BCIE indicates whether data compression is possible (b7=1) or not (b7=0). In the example, the BCIE indicates a UDI call where data compression is allowed (b7). If the BCIE indicates that data compression is not allowed, the MSC does not activate any data compression functions. The MSC checks whether the network supports the data compression. If it does, the MSC transmits indication that data compression is possible in a CALL PROCEEDING message. If the network does not support data compression, the MSC transmits indication that data compression is not possible.

In a mobile-terminating (MT) call, the MSC receives a BCIE indicating a UDI call from the visitor location register or the fixed network. The MSC transmits to the MS a SETUP message where the BCIE indicates that data compression is allowed (if the network supports data compression). The MS responds with a CALL CONFIRM message where the BCIE indicates whether data compression is allowed (b7=1) or not (b7=0).

The aforementioned call set-up signalling is fully in compliance with the GSM recommendations. The MSC thereafter reserves the required IWF resources by transmitting to the IWF an IWF Setup message that also contains the GSM BCIE.

The IWF controller 44 receives a SETUP message comprising the BCIE from the call control 43 of the MSC. The IWF controller 44 analyses the BCIE. On the basis of the analysis, the IWF controller reserves or configures a channel controller 400 for the data call. In the example, a channel controller 400 that supports a UDI call and data compression, such as the channel controller of FIG. 4, is configured or reserved for the data call. The channel controller 400 is connected on line. At this phase, the IWF starts operating according to the invention and its operation will be described with reference to FIGS. 5 and 6 as regards an MO call and with reference to FIGS. 7 and 8 as regards an MT call.

Figure 5:
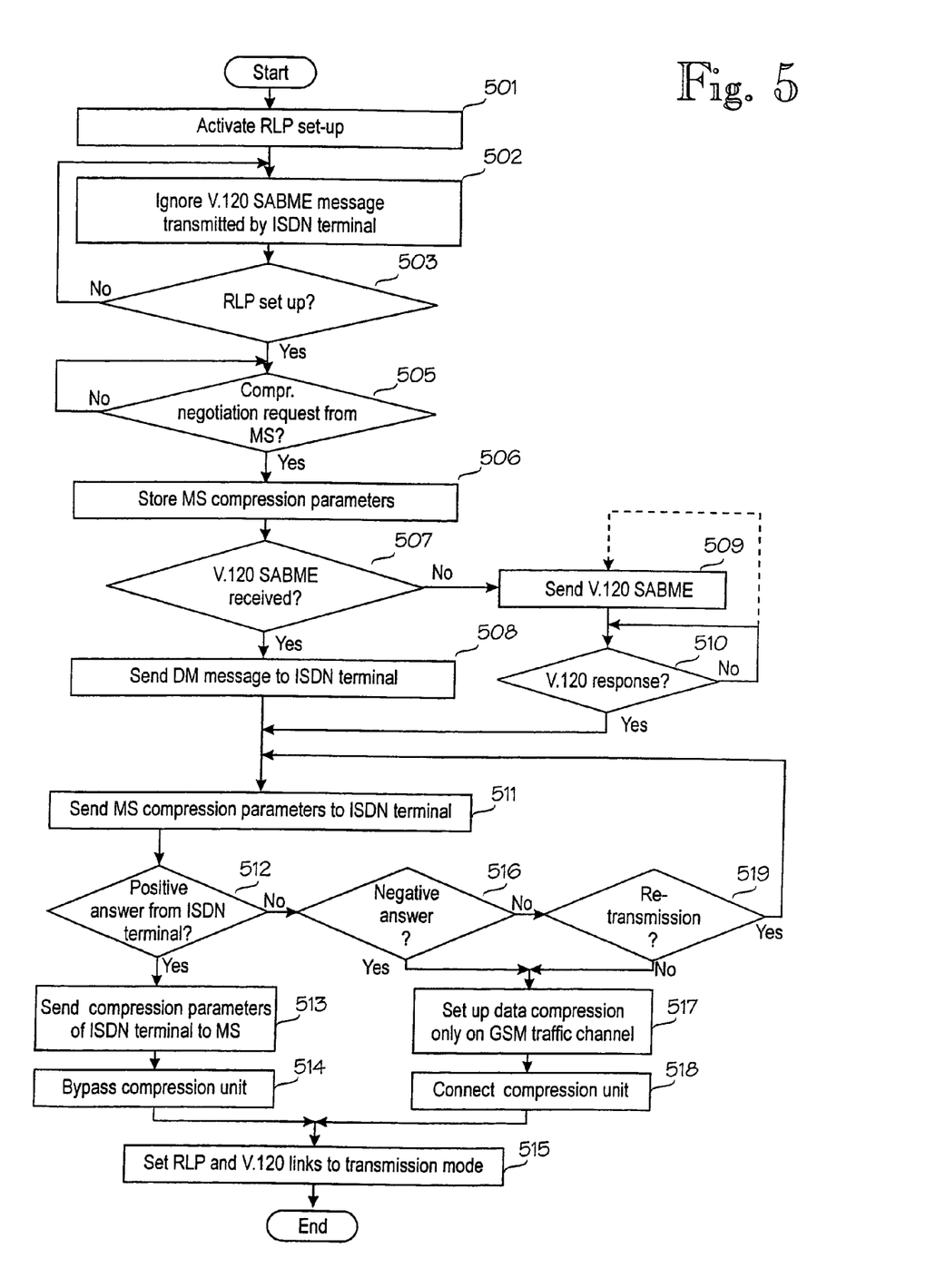
FIG. 5 is a flow chart illustrating the operation of an IWF according to the invention in a mobile-originating UDI call.

With reference to FIG. 5, the control function 407 of the channel controller 400 receives from the IWF controller 44 information that the call utilizes data compression. The control function 407 guides the L2R/RLP unit 404 to activate the RLP protocol set-up. The unit 404 then either transmits a SABME message to the MS, and after it has received a response it sets the RLP link to the disconnected mode. Alternatively, the unit 404 may wait for a SABME message from the MS and set the RLP link to the disconnected mode with a DM message (step 501). "SABME" and "DM" are messages defined for the RLP, V.120 and V.42 protocols. The disconnect mode is a mode of the RLP, V.120 and V.42 link where no data can be transmitted. The transmission mode is a mode of the RLP, V.120 and V.42 link where data can be transmitted.

An ISDN terminal equipment 1 (FIG. 1) may transmit a link set-up message SABME on the traffic channel 401 in order to set up a V.120 protocol if the set-up of the RLP on the GSM traffic channel 403 takes a sufficiently long time so that the control timer expires in the ISDN terminal equipment 1. The control function 407 commands the V.120 unit 401 not to respond to V.120 SABME messages transmitted by the ISDN terminal equipment (step 502). The process continues in this manner until the RLP link has been set up (step 503).

When the RLP link has been set up, the MS transmits an RLP XID frame in order to negotiate about the use of the data compression. When the unit 404 has received a compression negotiation request from the MS (step 505), the control function 407 stores the data compression parameters received in the XID frame from the MS (step 506). In step 507, the control function 407 checks whether a V.120 link set-up message (SABME) has already been received from the ISDN terminal equipment. If the V.120 SABME message has been received, the unit 401 responds to the message by transmitting to the ISDN terminal equipment a DM message that sets the V.120 link to the disconnected mode (step 508). If the unit 401 has not yet received the V.120 SABME message from the ISDN terminal equipment, the unit 401 transmits a V.120 link set-up request (SABME) to the ISDN terminal equipment (step 509). The unit 410 thereafter waits until the ISDN terminal equipment transmits a response according to the V.120 protocol (step 510).

The process proceeds from steps 508 and 510 to step 511, where the control function 407 transmits the data compression parameters received from the MS to the ISDN terminal equipment in a V.120 XID frame. In step 512, it is checked whether a positive answer has been received from the ISDN terminal equipment. The positive answer is a V.120 XID frame comprising the compression parameters accepted by the ISDN terminal equipment. They may be identical to those transmitted to the ISDN terminal equipment in step 511, or they may have been modified by the ISDN terminal equipment. When a positive answer has been received in step 512, the control function 407 transmits, via the unit 404, the data compression parameters received from the ISDN terminal equipment to the MS in a V.120 XID frame (step 513). The data compression has now been negotiated from end to end, and the control function 407 guides the switches S1 and S2 to position I, where the data compression unit 406 is bypassed (step 514). The RLP and V.120 links are thereafter set in the transmission mode (step 515). The unit 404 runs an RLP with the MS and the unit 401 runs a V.120 protocol with the ISDN terminal equipment. The compressed data is transmitted as such between the RLP and the V.120 protocol (between the units 404 and 401).

If a positive answer is not received in step 511, it is checked in step 516 whether the answer is negative. In a negative answer the ISDN terminal equipment declares that data compression cannot be used. If a negative answer has not been received either, it is checked in step 519 whether the compression parameters can be retransmitted. Retransmission is typically allowed at certain intervals and a predetermined number of times N. If there are retransmission times left, the process returns to step 511. If a negative answer has been received or retransmissions can no longer be carried out, the process proceeds to step 517, where data compression is only set up on the GSM traffic channel. In such a case, the control function 407 transmits to the MS an RLP XID frame comprising the data compression parameters selected by the control function 407 itself. The control function 407 then guides the switches S1 and S2 to position II, where the data compression unit 406 is connected on line. In such a case, all the uncompressed data arriving from the unit 401 is compressed in the unit 406 before transmission to the GSM traffic channel. Correspondingly, all the compressed data arriving from the unit 404 is decompressed in the unit 406 before transmission to the fixed network traffic channel 402.

Figure 6:
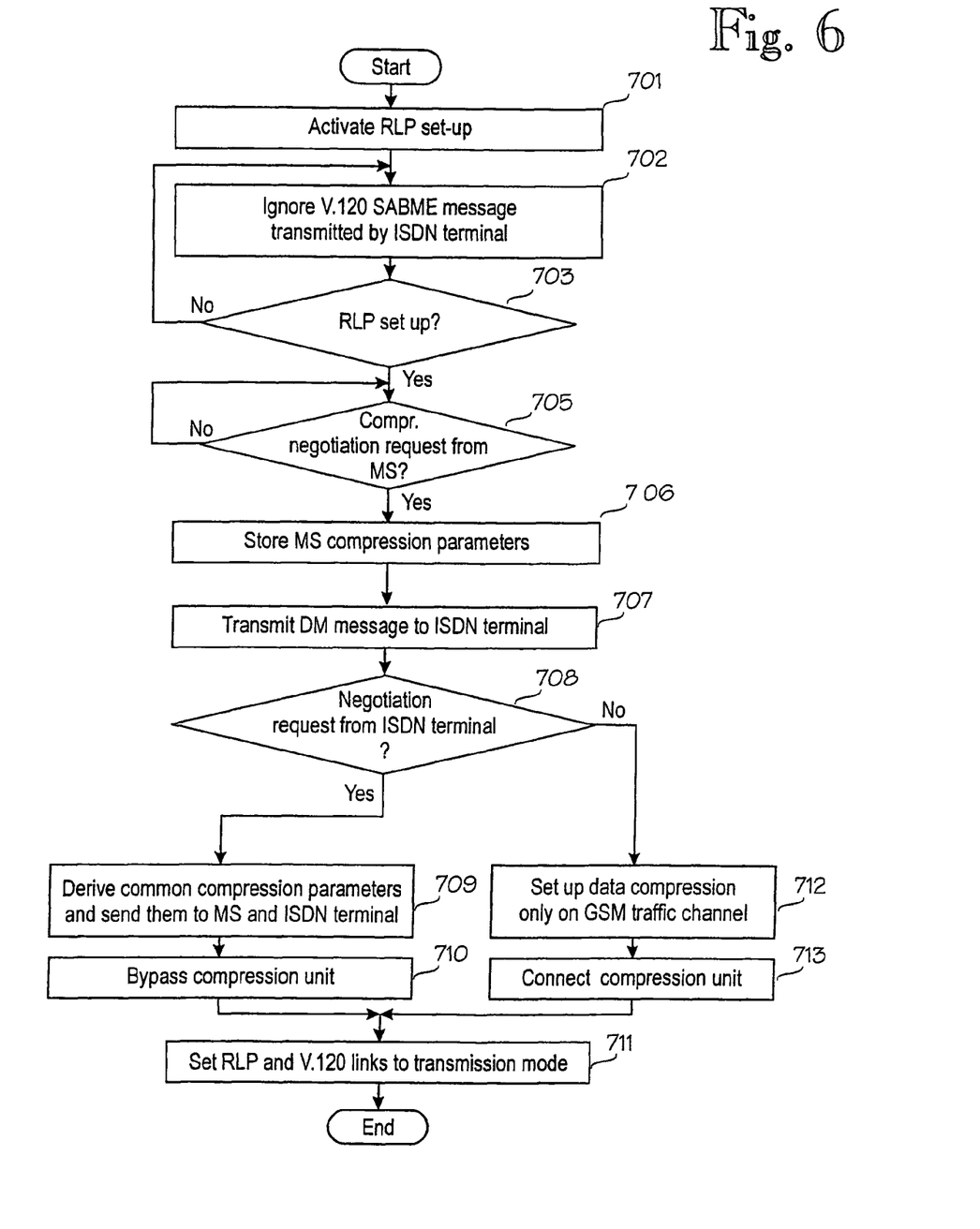
FIG. 6 is a flow chart illustrating the operation of the IWF according to the invention in a mobile-terminating UDI data call.

With reference to FIG. 6, in an MT call the control function 407 of the channel controller 400 receives from the IWF controller 44 information that data compression is used in the call. The control function 407 guides the L2R/RLP unit 404 to activate the RLP set-up. The call set-up then proceeds through steps 701, 702, 703, 705 and 706 of FIG. 7, which are identical to steps 501, 502, 503, 505 and 506 of FIG. 5.

The call set-up then proceeds to step 707, where the control function 407 responds to a V.120 link set-up request (SABME) transmitted by the ISDN terminal equipment with a DM message that sets the V.120 link to the disconnected mode. In step 708, the control function 407 waits for the ISDN terminal equipment to transmit a V.120 XID frame requesting for a data compression negotiation and providing the compression parameters. When the XID frame has been received, the control function 407 compares the data compression parameters received from the MS to the data compression parameters received from the ISDN terminal equipment and determines common data compression parameter values that can be accepted by both the MS and the ISDN terminal equipments. The control function 407 then transmits the common data compression parameter values to the MS in an RLP XID frame in response to the XID negotiation offer transmitted by the MS and to the ISDN terminal equipment in a V.120 XID frame in response to the XID negotiation offer transmitted by the ISDN terminal equipment (step 709). The compression has thus been negotiated from end to end. The control function 407 guides the switches S1 and S2 to position I, where the data compression unit 406 is bypassed and the compressed data is transmitted as such between the units 404 and 401.

If no negotiation request is received from the ISDN terminal equipment in step 708, a negative answer has been received or no more retransmissions can be carried out, the process moves on to step 712, where data compression is only set up on the GSM traffic channel. In such a case, the control function 407 transmits to the MS an RLP XID frame containing the data compression parameter selected by the control function 407 itself. The control function 407 then guides the switches S1 and S2 to position II, where the data compression unit 406 is connected on line (step 713). In such a case, all the uncompressed data arriving from the unit 401 is compressed in the unit 406 before transmission to the GSM traffic channel. Correspondingly, all the compressed data arriving from the unit 404 is decompressed in the unit 406 before transmission to the fixed network traffic channel 402.

Figure 7:
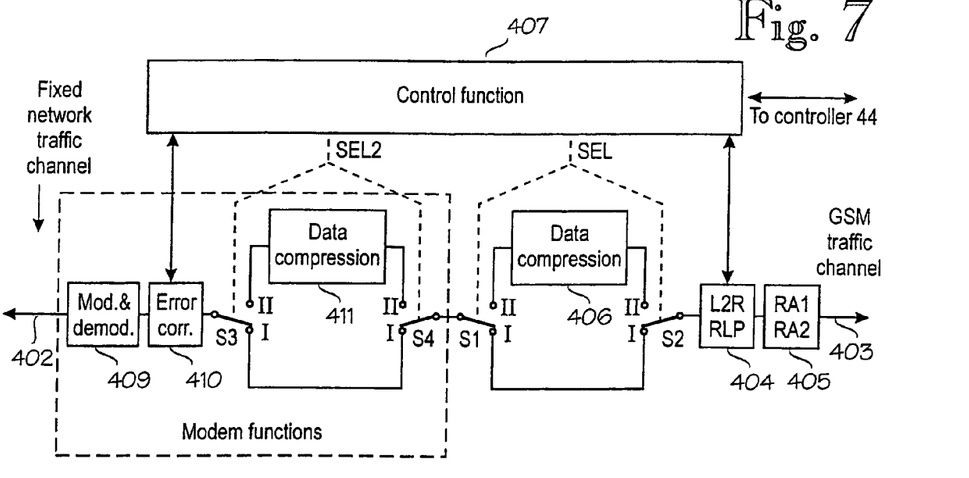
FIG. 7 is a flow chart of a channel controller according to the invention supporting a modem call through the PSTN.

FIG. 7 is a general block diagram illustrating as an example a channel controller 400 according to the second embodiment of the invention for modem calls. A rate adaptation unit 405 required towards the GSM traffic channel, the L2R/RLP unit 404, the data compression unit 406 and the switches S1 and S2 have similar structure and operation as in the channel controller of FIG. 4. The difference between the channel controllers of FIG. 4 and FIG. 7 is that in the latter the fixed network protocol unit 401 of FIG. 4 has been replaced with a modem function unit 408.

The modem function unit 408 comprises a modulation and demodulation unit 409, an error correction unit 410 and a data compression unit 411. The error correction unit 410 implements error correction according to the V.42 protocol. The error correction unit 410 and the L2R/RLP unit 404 can be connected together with the switch functions S1, S2, S3 and S4 either directly or via the data compression unit 411 or the data compression unit 406. When the switches S1 to S4 are in position I, the units 410 and 404 are connected directly together, so that compressed data propagates as such through the IWF. If the end-to-end compression negotiation has failed but data compression is used on the GSM traffic channel, the switches S3 and S4 are in position I which bypasses the compression unit 411, and the switches S1 and S2 are in position II which connects the compression unit 406 on line. In such a case, the data compression unit 406 carries out the V.42 bis data compression on data transmitted from the fixed network traffic channel 402 to the GSM traffic channel 403, and the V.42 data decompression in the opposite direction. If the end-to-end data compression negotiation has failed but data compression is used over the modem connection, the switches S1 and S2 are in position I which bypasses the data compression unit 406, and the switches S3 and S4 are in position II which connects the data compression unit 411 on line. In such a case, the unit 411 performs the V.42 bis data compression on data transmitted from the GSM traffic channel 403 to the fixed network traffic channel 402, and the V.42 bis data decompression in the opposite direction. The switch functions S1 to S4 and the units 404 and 408 are controlled by the control function 407 according to the same principles as in FIG. 8.

The operation of the channel controller of FIG. 7 and the related set-up of an MO and an MT data call will be described below. In a modem call, the MSC and the MS indicate in the call set-up signalling that they both support data compression, as described above in connection with FIG. 4. The MSC thereafter reserves the required IWF resources by transmitting to the IWF an IWF Setup message that also contains the GSM BCIE.

The IWF controller 44 receives from the MSC call control 43 a SETUP message containing the BCIE. The IWF controller 44 analyses the BCIE. On the basis of the analysis, the IWF controller reserves or configures a channel controller that supports the modem call and data compression, such as the channel controller of FIG. 9, for the data call. The channel controller 400 is connected on line. In this step, the IWF starts operating according to the invention and its operation will be described with reference to FIGS. 8 and 9 as regards an MO call and with reference to FIGS. 8 and 10 as regards an MT call.

Figure 8:
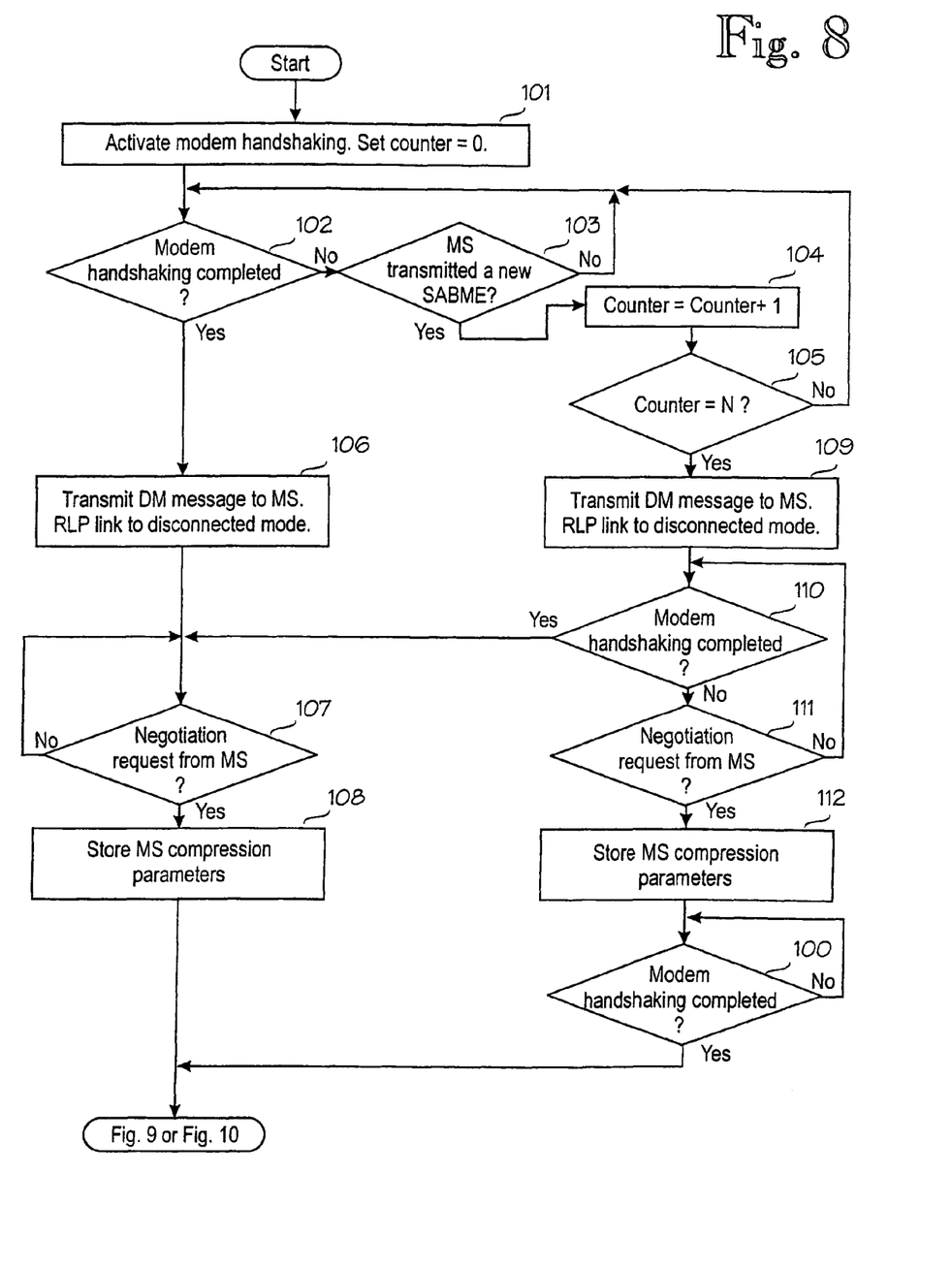
FIGS. 8, 9 and 10 are flow charts illustrating the operation of the IWF according to the invention in a mobile-originating and a mobile-terminating modem call.

With reference to FIG. 8, the control function 407 of the channel controller 400 receives from the IWF controller 44 information that the call utilizes data compression. The control function 407 guides the modem function unit 408 to activate a modem handshaking with the PSTN modem (step 101). At the same time a counter that calculates the number of the SABME messages transmitted by the MS is set to 0. In step 102, it is checked whether the modem handshaking has been completed. If not, it is checked whether the MS has transmitted the first SABME message or retransmitted the message after the retransmission counter has expired (step 103). If it has, the control function 407 does not respond to the message but increments the counter by one (step 104), whereafter it is checked whether the counter has reached a value N (step 105). N is the maximum number of retransmissions by the MS or it is smaller than the maximum number of retransmissions. Since according to the invention the RLP link set-up should be delayed as long as possible if the modem handshaking has not yet been completed, the IWF only responds to the $N^{th}$ message. If the value of the counter is smaller than N in step 105, the process returns to step 102 to check whether the modem handshaking has been completed.

If it is detected in step 102 that the modem handshaking has been completed, the control function 407 transmits to the MS a DM message that sets the RLP link to the disconnected mode (step 106). The MS transmits an XID frame to the IWF in order to negotiate about the use of the data compression (step 107). The control function 407 stores the data compression parameters that are received in this XID frame (step 108). The control function 407 does not respond to the XID frame, however, since the compression negotiation on the modem connection has not yet been carried out. Since the negotiation on the modem connection is slow, the MS may retransmit the XID frame several times without a response.

If the modem handshaking has not yet been completed in step 105, even though the MS has retransmitted the SABME message N times, the control function 407 responds to the SABME message transmitted by the MS with 25' a DM message in order to set up the RLP link in the disconnected mode (step 109). It is then checked whether the modem handshaking has been completed (step 110). If it has, the process proceeds to step 107. If it has not, it is checked in step 111 whether the MS has transmitted an XID frame. If it has not, the process returns to step 110. If it has, no response is provided to the XID frame and the compression parameters that were received from the MS in the RLP XID frame are stored (step 112). The process is then on hold until the modem handshaking has been completed (step 100).

Figure 9:
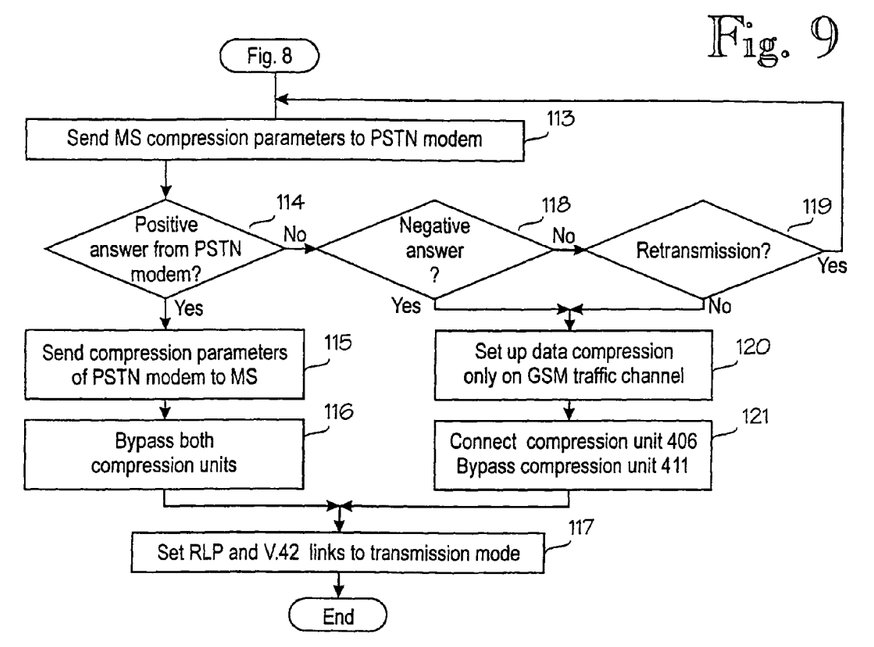

The process proceeds from steps 108 and 100 of FIG. 8 to step 101 of FIG. 9, where the control function 407 transmits to the PSTN modem a V.42 XID frame that contains the compression parameters received from the MS. Normally the PSTN modem responds by transmitting a V.42 XID frame that contains either the compression parameters transmitted in step 113 or the compression parameters modified by the PSTN modem. If it is detected in step 114 that the PSTN modem has transmitted such a positive response, the control function 407 transmits the data compression parameters received from the PSTN modem to the MS in an RLP XID frame in response to the original XID negotiation offer of the MS (that was possibly retransmitted several times) (step 115). The data compression has now been negotiated from end to end. The control function 407 guides all the switches S1 to S4 to position I, where both data compression units 406 and 411 are bypassed (step 116). In such a case, the compressed data propagates as such between the units 404 and 410. The RLP and V.42 links are then set to the transmission mode and the data transmission may begin (step 117).

If a positive answer is not received from the PSTN modem in step 114, it is checked whether a negative answer was received (step 118). If not, it is checked whether a retransmission can be carried out (step 119). If a retransmission is executed, the process proceeds to step 113. If a negative answer has been received or no retransmission is carried out, the end-to-end data compression negotiation has failed. In such a case, the control function 407 may set up data compression on the GSM traffic channel (step 120). It transmits a compression parameter it has selected itself to the MS in an RLP XID frame. The control function 407 then connects (step 121) the data compression unit 406 on line (switches S1 and S2 in position II) and bypasses the data compression unit 411 (switches S3 and S4 in position I).

An MT modem call propagates up to the successful modem handshaking in the same manner as an MO call in FIG. 8. After the successful modem handshaking the process proceeds to FIG. 10, where the control function 407 waits for the PSTN modem to transmit a V.42 XID frame containing the data compression parameters (step 122). When the XID frame has been received, the control function 407 compares the data compression parameters received from the MS to the data compression parameters received from the PSTN modem and determines common parameter values that can be accepted by both the MS and the PSTN modem. The control function 407 then transmits these common data compression parameter values to the MS in an RLP XID frame in response to the original XID negotiation offer of the MS (that was possibly retransmitted several times) and to the PSTN modem in a V.42 XID frame in response to the XID negotiation offer of the PSTN modem (step 123). The data compression has thus been negotiated from end to end. The control function 407 then sets the switches S1 to S4 to position I, where both data compression units 406 and 411 are bypassed (step 124). The RLP and V.42 links are then set to the transmission mode (step 130). If the control function 407 does not receive an XID frame from the PSTN modem, it determines common parameter values that can be accepted by both the MS and the PSTN modem. The control function 407 then transmits these common data compression parameter values to the MS in an RLP XID frame in response to the original XID negotiation offer of the MS (that was possibly retransmitted several times) and to the PSTN modem in a V.42 XID frame in response to the XID negotiation offer of the PSTN modem (step 126). The data compression has thus been negotiated from end to end. The control function 407 then sets the switches S1 to S4 to position I, where both data compression units 406 and 411 are bypassed (step 127). The RLP and V.42 links are then set in the transmission mode (step 130).

Figure 10:
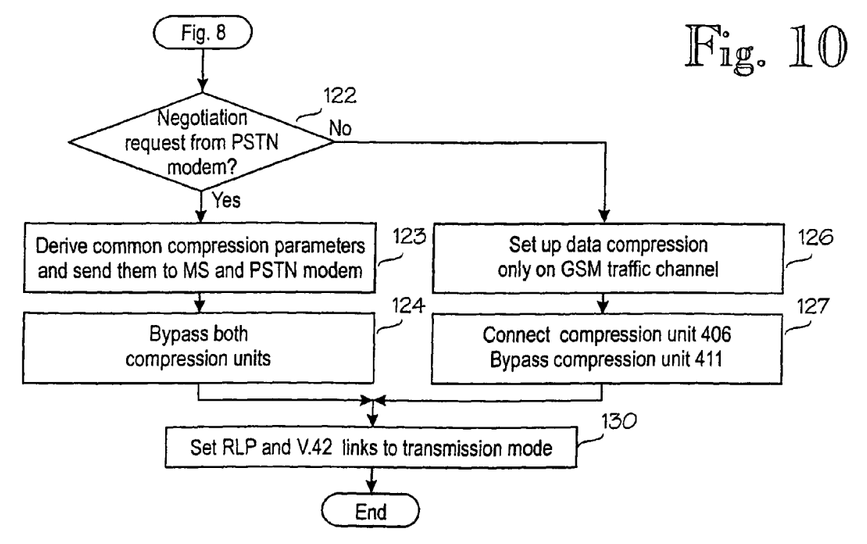

If the control function 407 does not receive an XID frame from the PSTN modem within a predetermined time period, it considers the end-to-end negotiation to have failed and sets up data compression only on the GSM traffic channel. The control function 407 then transmits the compression parameters it has selected itself in an RLP XID frame to the MS (step 124). The conrol function 407 then connects the data compression unit 406 on line switches S1 and S2 in position II) and bypasses the data compression unit 11 (switches S3 and S4 in position I). The process then proceeds to step 23.

It is evident for a person skilled in the art that as the technology deelops the basic idea of the invention can be implemented in several different ways. Therefore the invention and the embodiments thereof are not restricted to the examples disclosed above but they can vary within the scope of the claims.

The invention claimed is:

1. An apparatus, comprising:
a processor configured to
   connect a first leg in a first telecommunications network to a second leg in a second telecommunications network when an error correction protocol and data compression are used on each leg, and
   delay a set-up of an error correction protocol of a leg having a faster handshaking and/or delay the data compression negotiation until a set-up of an error correction protocol of a leg having a slower handshaking has been completed and the data compression negotiation can be started.

2. The apparatus of claim 1, wherein the apparatus comprises or is comprised in a network element.

3. An apparatus according to claim 1, wherein the processor is further configured to
exchange data compression negotiation messages according to a first error correction protocol between a first data transmitter and the processor on the first leg,
exchange data compression negotiation messages according to a second error correction protocol between the processor and a second data transmitter on the second leg, and
time the exchange of the data compression negotiation messages on the first leg and the exchange of the data compression negotiation messages on the second leg with respect to each other such that a virtual end-to-end data compression negotiation is established between the first and second data transmitters.

4. An apparatus according to claim 1, further comprising:
a transmitter configured to transmit compressed data through the apparatus after a successful end-to-end data compression negotiation.

5. An apparatus according to claim 1, wherein the processor is further configured to perform a data compression negotiation on one leg in response to a failed end-to-end data compression negotiation.

6. An apparatus according to claim 5, wherein the processor is further configured to
perform data compression on data transmitted from a leg that does not utilize data compression to a leg utilizing data compression, and
perform data decompression on data transmitted from the leg utilizing data compression to the leg that does not utilize data compression.

7. An apparatus according to claim 1, wherein the processor is further configured to delay the set-up of the error correction protocol of the faster leg by not responding to the received set-up messages for a time period allowed by the error correction protocol or until the error correction protocol of the slower leg has been set up.

8. An apparatus according claim 1, wherein the apparatus comprises a mobile services switching center.

9. An apparatus, comprising:
a processor configured to
   provide a data link between a first data transmitter of a first telecommunications network and a second data transmitter of a second telecommunications network, said data link comprising two legs wherein a first leg is between the first data transmitter and the processor and a second leg is between the second data transmitter and the processor, when an error correction protocol is used on each leg,
   exchange data compression negotiation messages of a first error correction protocol on the first leg between the first data transmitter and the processor, and
   exchange data compression negotiation messages of a second error correction protocol on the second leg between the processor and the second data transmitter, wherein
   the processor is configured to delay a set-up of an error correction protocol of a leg having a faster handshaking and/or delay the data compression negotiation until a set-up of an error correction protocol of a leg having a slower handshaking has been completed and the data compression negotiation can be started.

10. An apparatus according to claim 9, wherein the processor is further configured to time the exchange of the data compression negotiation messages on the first leg and the exchange of the data compression negotiation messages on the second leg with respect to each other such that a virtual end-to-end data compression negotiation is established between the first and second data transmitters.

11. An apparatus according to claim 9, further comprising:
a transmitter configured to transmit compressed data through the apparatus after a successful end-to-end data compression negotiation.

12. An apparatus according to claim 9, wherein the processor is further configured to perform a data compression negotiation on one leg in response to a failed end-to-end data compression negotiation.

13. An apparatus according to claim 12, wherein the processor is further configured to perform data compression on data transmitted from a leg that does not utilize data compression to a leg utilizing data compression and to perform data decompression on data transmitted from the leg utilizing data compression to the leg that does not utilize data compression.

14. An apparatus according to claim 9, wherein the processor is further configured to delay the set-up of the error correction protocol of the faster leg by not responding to the received set-up messages for a time period allowed by the error correction protocol or until the error correction protocol of the slower leg has been set up.

15. A method, comprising:
providing a data link between a first data transmitter of a first telecommunications network and a second data transmitter of a second telecommunications network, said data link comprising two legs wherein the first leg is between the first data transmitter and network element and the second leg is between the second data transmitter and the network element, when an error correction protocol is used on each leg;
exchanging data compression negotiation messages of a first error correction protocol on the first leg between the first data transmitter and the network element;
exchanging data compression negotiation messages of a second error correction protocol on the second leg between the network element and the second data transmitter; and
delaying a set-up of an error correction protocol of a leg having a faster handshaking and/or delaying the data compression negotiation until a set-up of an error correction protocol of a leg having a slower handshaking has been completed and the data compression negotiation can be started.

16. A method according to claim 15, further comprising: timing the exchange of the data compression negotiation messages on the first leg and the exchange of the data compression negotiation messages on the second leg with respect to each other such that a virtual end-to-end data compression negotiation is established between the first and second data transmitters.

17. A method according to claim 15, further comprising: transmitting compressed data through the network element after a successful end-to-end data compression negotiation.

18. A method according to claim 15, further comprising: performing a data compression negotiation on one leg in response to a failed end-to-end data compression negotiation.

19. A method according to claim 18, further comprising: performing data compression on data transmitted from a leg that does not utilize data compression to a leg utilizing data compression; and
performing data decompression on data transmitted from the leg utilizing data compression to the leg that does not utilize data compression.

20. A method according to claim 15, wherein the delaying further comprises delaying the set-up of the error correction protocol of the faster leg by not responding to the received set-up messages for a time period allowed by the error correction protocol or until the error correction protocol of the slower leg has been set up.

21. An apparatus, comprising:
connection means for connecting a first leg in a first telecommunications network to a second leg in a second telecommunications network when an error correction protocol and data compression are used on each leg; and
delay means for delaying a set-up of an error correction protocol of a leg having a faster handshaking and/or delay the data compression negotiation until a set-up of an error correction protocol of a leg having a slower handshaking has been completed and the data compression negotiation can be started.

22. An apparatus, comprising:
linking means for providing a data link between a first data transmitter of a first telecommunications network and a second data transmitter of a second telecommunications network, said data link comprising a first and second leg, wherein the first leg is between the first data transmitter and the linking means and the second leg is between the second data transmitter and the linking means, when an error correction protocol is used on each leg;
first exchanging means for exchanging data compression negotiation messages of a first error correction protocol on the first leg between the first data transmitter and the linking means; and
second exchanging means for exchanging data compression negotiation messages of a second error correction protocol on the second leg between the linking means and the second data transmitter, wherein
the linking means delays a set-up of an error correction protocol of a leg having a faster handshaking and/or delays the data compression negotiation until the set-up of an error correction protocol of a leg having a slower handshaking has been completed and the data compression negotiation can be started.

23. A computer program embodied on a computer readable medium, the program configured to control a processor to perform a process, the process comprising:
providing a data link between a first data transmitter of a first telecommunications network and a second data transmitter of a second telecommunications network, said data link comprising a first and second leg, wherein the first leg is between the first data transmitter and a network element and the second leg is between the second data transmitter and the network element, when an error correction protocol is used on each leg;
exchanging data compression negotiation messages of a first error correction protocol on the first leg between the first data transmitter and the network element;
exchanging data compression negotiation messages of a second error correction protocol on the second leg between the network element and the second data transmitter; and
delaying a set-up of an error correction protocol of a leg having a faster handshaking and/or delaying the data compression negotiation until a set-up of an error correction protocol of a leg having a slower handshaking has been completed and the data compression negotiation can be started.

24. A method, comprising:
connecting a first leg in a first telecommunications network to a second leg in a second telecommunications network when an error correction protocol and data compression are used on each leg; and
delaying a set-up of an error correction protocol of a leg having a faster handshaking and/or delay the data compression negotiation until a set-up of an error correction protocol of a leg having a slower handshaking has been completed and the data compression negotiation can be started.

25. A method according to claim 24, further comprising: exchanging data compression negotiation messages according to a first error correction protocol between a first data transmitter and a network element on the first leg;
exchanging data compression negotiation messages according to a second error correction protocol between the network element and a second data transmitter on the second leg; and
timing the exchange of the data compression negotiation messages on the first leg and the exchange of the data compression negotiation messages on the second leg with respect to each other such that a virtual end-to-end data compression negotiation is established between the first and second data transmitters.

26. A method according to claim 24, further comprising: transmitting compressed data through a network element after a successful end-to-end data compression negotiation.

27. A method according to claim 24, further comprising: performing a data compression negotiation on one leg in response to a failed end-to-end data compression negotiation.

28. A method according to claim 27, further comprising: performing data compression on data transmitted from a leg that does not utilize data compression to a leg utilizing data compression; and
performing data decompression on data transmitted from the leg utilizing data compression to the leg that does not utilize data compression.

29. A method according to claim 24, wherein the delaying further comprises delaying the set-up of the error correction protocol of the faster leg by not responding to the received set-up messages for a time period allowed by the error correction protocol or until the error correction protocol of the slower leg has been set up.

30. A computer program embodied on a computer-readable medium, the program configured to control a processor to perform a process, the process comprising:
- connecting a first leg in a first telecommunications network to a second leg in a second telecommunications network when an error correction protocol and data compression are used on each leg; and
- delaying a set-up of an error correction protocol of a leg having a faster handshaking and/or delay the data compression negotiation until a set-up of an error correction protocol of a leg having a slower handshaking has been completed and the data compression negotiation can be started.

* * * * *